Figure 1:
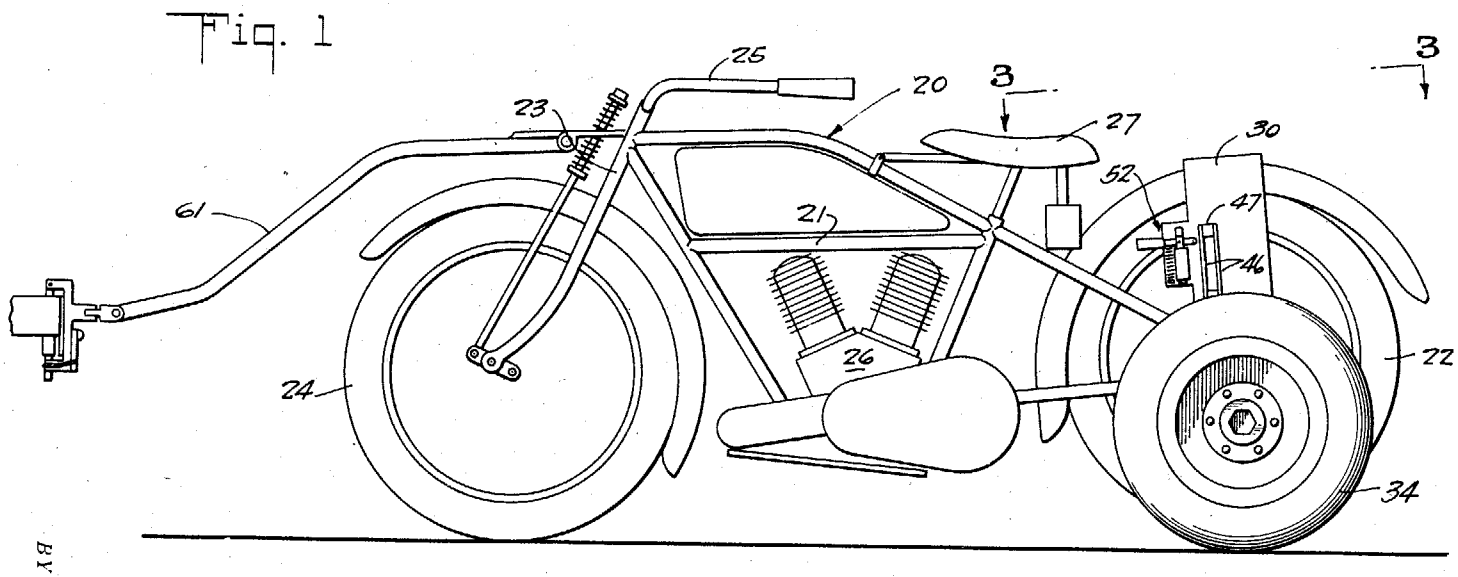

A. L. HESS

April 12, 1932. AUXILIARY WHEEL ATTACHMENT FOR CYCLES Re. 18,424

Original Filed Feb. 10, 1930 5 Sheets-Sheet 1

INVENTOR
Albert Laurance Hess
BY
Westall and Wallace
ATTORNEYS

INVENTOR
Albert Laurance Hess
BY Westall and Wallace
ATTORNEYS

A. L. HESS

April 12, 1932. AUXILIARY WHEEL ATTACHMENT FOR CYCLES Re. 18,424

Original Filed Feb. 10, 1930 5 Sheets-Sheet 3

INVENTOR
Albert Laurance Hess
BY
Westall and Wallace
ATTORNEY

A. L. HESS

April 12, 1932. AUXILIARY WHEEL ATTACHMENT FOR CYCLES Re. 18,424

Original Filed Feb. 10, 1930 5 Sheets-Sheet 4

INVENTOR
Albert Laurance Hess
BY
Westall and Wallace
ATTORNEYS

A. L. HESS

April 12, 1932. AUXILIARY WHEEL ATTACHMENT FOR CYCLES Re. 18,424

Original Filed Feb. 10, 1930 5 Sheets-Sheet 5

INVENTOR
Albert Laurance Hess

BY Westall and Wallace
ATTORNEYS

Reissued Apr. 12, 1932

Re. 18,424

UNITED STATES PATENT OFFICE

ALBERT LAURANCE HESS, OF LOS ANGELES, CALIFORNIA, ASSIGNOR TO CYCLETOW CORPORATION, LTD., OF LOS ANGELES, CALIFORNIA, A CORPORATION OF CALIFORNIA

AUXILIARY WHEEL ATTACHMENT FOR CYCLES

Original No. 1,820,190, dated August 25, 1931, Serial No. 427,181, filed February 10, 1930. Renewed November 10, 1930. Application for reissue filed August 31, 1931. Serial No. 560,442.

This invention relates to a bicycle convertible into a tricycle, or a four wheel vehicle. The stability of a bicycle is maintained by steering to hold the centre of gravity in proper position, while a tricycle is stable because of its three point support. In many instances, bicycles are advantageous as a vehicle for transport to certain points and it is then desirable to tow the vehicle back. A particular instance is that wherein automobile service stations find it necessary to send a service man to drive a car from a distant point to the service station. Motorcycles are commonly used for this purpose and under the present practice, two men are sent from the service station, one to drive the car on return and the other to drive the motorcycle. Such practice is uneconomical as only one man is needed for actual work to be performed in driving the automobile.

The present invention has for its primary object the provision of a bicycle such as a motorcycle with an attachment to convert it into a tricycle. Another object of this invention is to provide an attachment such that the bicycle may be converted into a tricycle or a four wheel cycle at will. To this end I have provided foldable arms carrying tricycle wheels which may be positioned in inoperative position out of the way so that the vehicle may be operated as a bicycle and in open or operative position of the tricycle wheels to afford a tricycle or a four wheel cycle. Conditions frequently arise such as wet weather, or sandy or very rough roads which render the use of a motorcycle dangerous or impossible. I have therefore provided an intermediate position of the foldable arms in which the tricycle wheels serve as carrier wheels, to support the motorcycle which at the same time has both its wheels on the ground for operation under its own power. In addition to the broader objects of this invention, there are certain details of structure contributing to simplicity and economy of construction and ease of manipulation in converting the vehicle from a bicycle into a tricycle or vice versa.

These objects together with other objects and corresponding accomplishments are obtained by means of the embodiment of my invention illustrated in the accompanying drawings, in which:—

Figure 2:
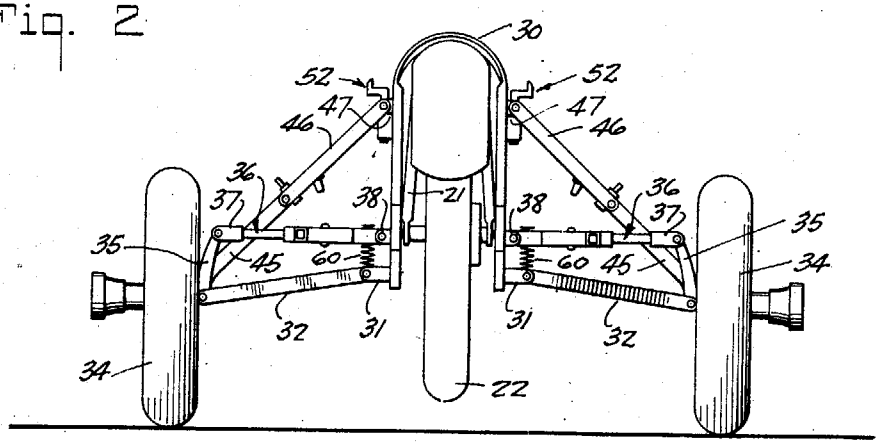
Figure 3:
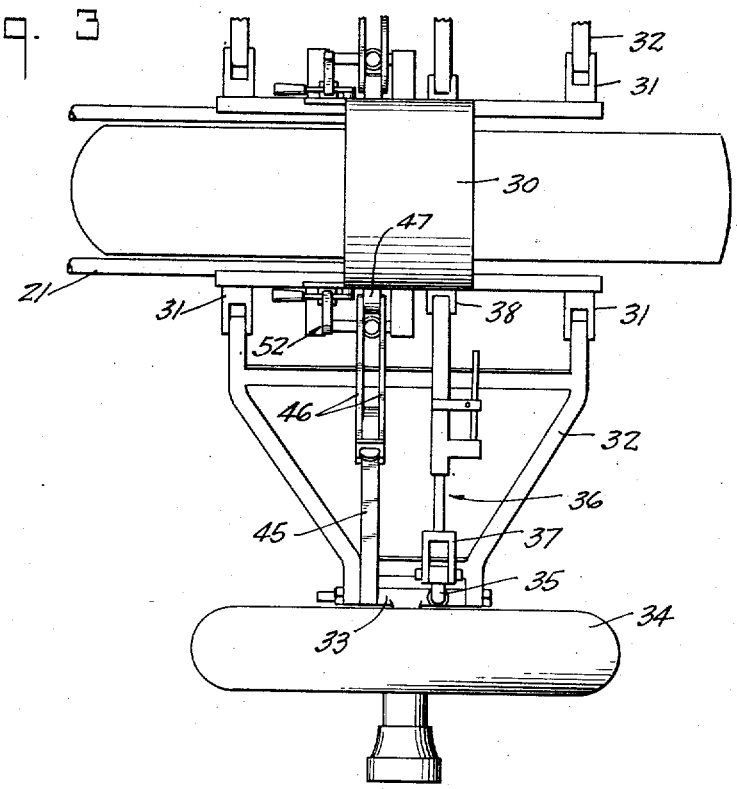
Figure 4:
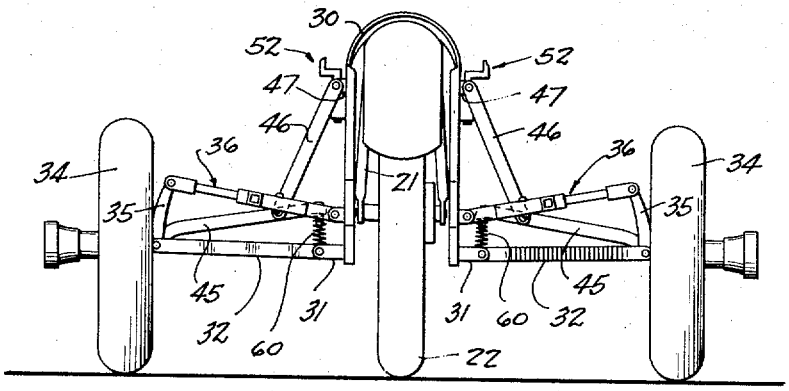
Figure 5:
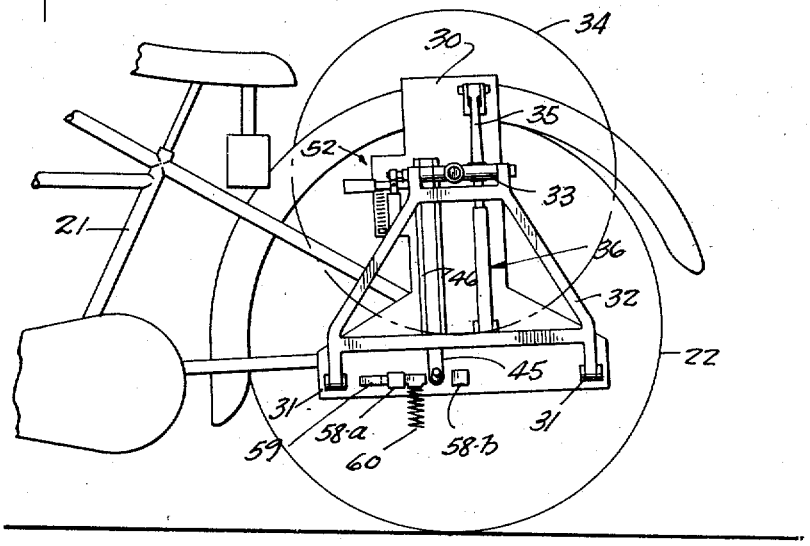
Figure 6:
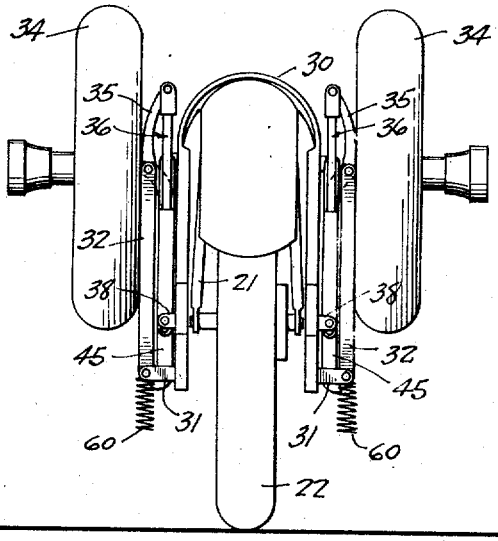
Figure 7:
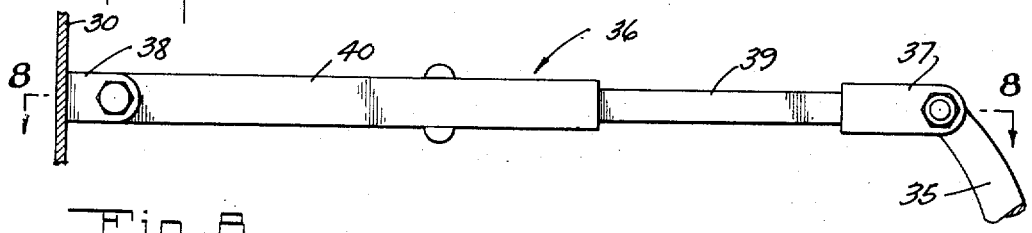
Figure 8:
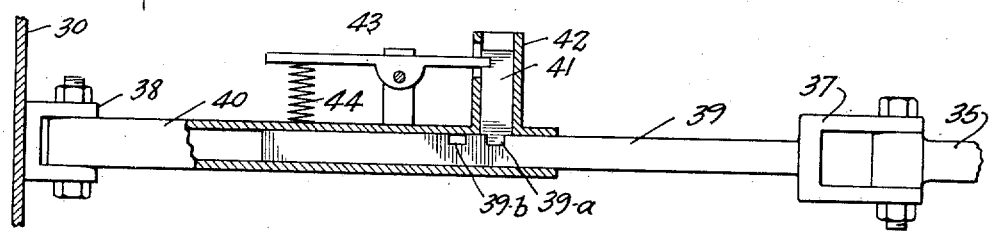
Figure 9:
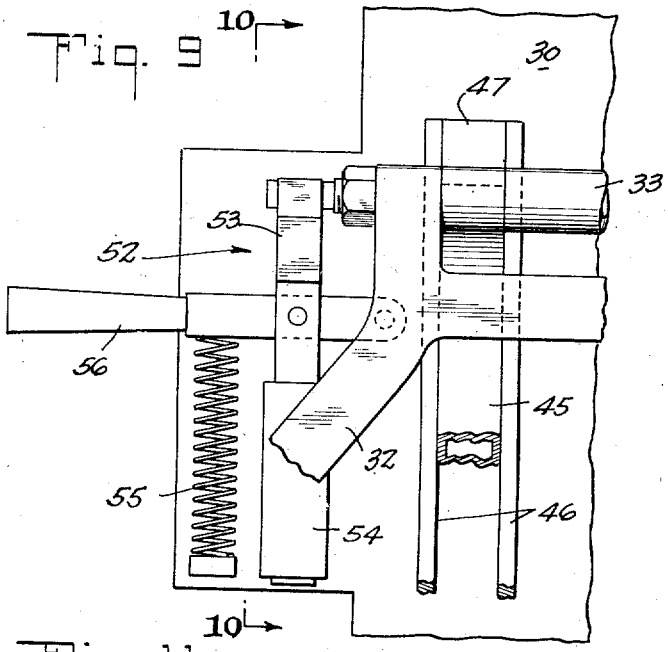
Figure 10:
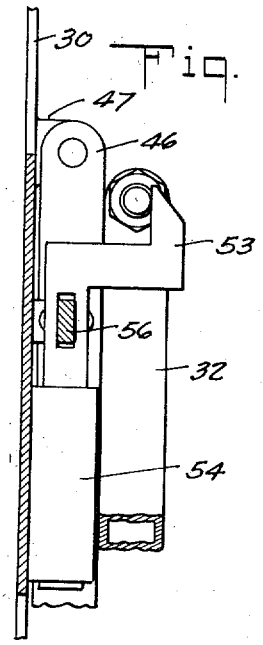
Figure 11:
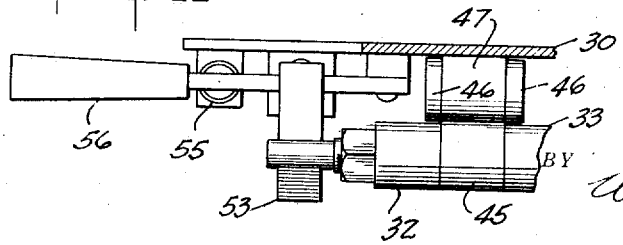
Figure 12:
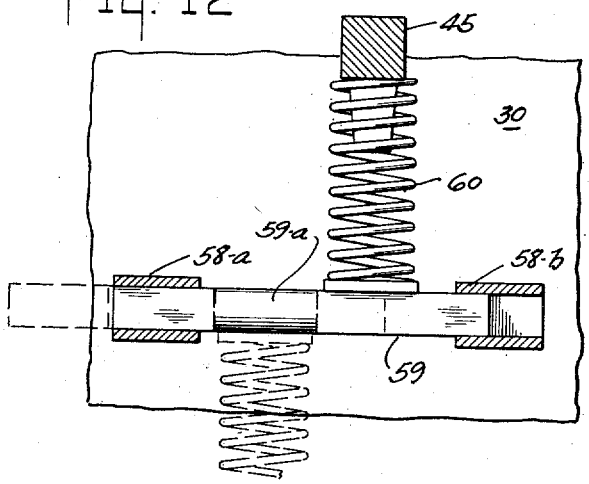
Figure 13:
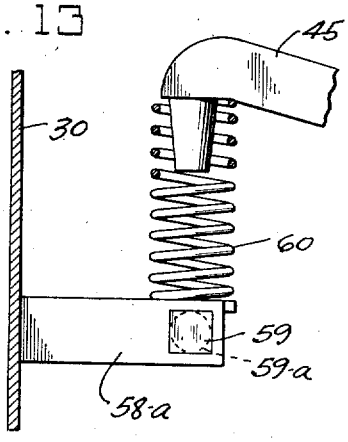
Figure 14:
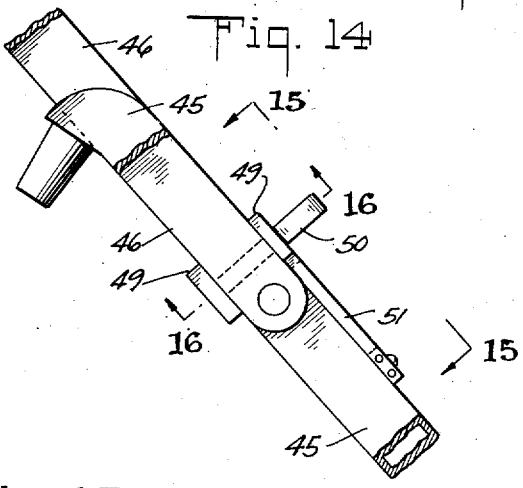
Figure 15:
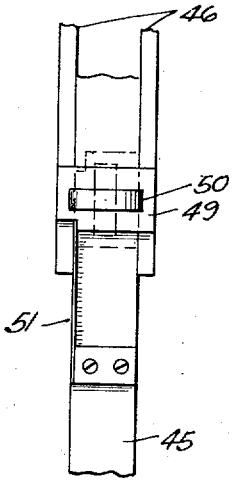
Figure 16:
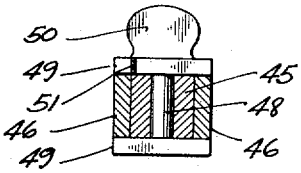

Fig. 1 is a side elevation of a preferred form of my convertible bicycle arranged as a tricycle and attached to the rear of a vehicle shown fragmentarily for towing, the arms being in open tricycle position; Fig. 2 is a rear elevation of the bicycle as shown in Fig. 1; Fig. 3 is a plan view on an enlarged scale of the rear portion of the bicycle as shown in Fig. 1; Fig. 4 is a rear elevation of the bicycle with its rear wheel on the ground to operate as a four wheel cycle; Fig. 5 is a side elevation on an enlarged scale of the rear portion of the bicycle, arranged as a bicycle, the arms being in folded position; Fig. 6 is a rear elevation of the bicycle as shown in Fig. 5; Fig. 7 is a detail on an enlarged scale of one of the rods; Fig. 8 is a section as seen substantially on line 8—8 of Fig. 7; Fig. 9 is an elevation of the latch to hold the arm in folded position; Fig. 10 is a section as seen on line 10—10 of Fig. 9; Fig. 11 is a top plan view of the latch shown in Fig. 9; Fig. 12 is an elevation partly in section of the spring carrying arrangement for one of the toggle arms; Fig. 13 is an end view of this arrangement; Fig. 14 is a detail of the locking device on the toggle arm; Fig. 15 is a view taken on line 15—15 of Fig. 14; and Fig. 16 is a section as seen on line 16—16 of Fig. 14.

Referring more particularly to the drawings, a motorcycle of standard construction is generally indicated by 20, and has the usual frame 21 equipped with a driving or traction wheel 22 at its rear end and having a forked steering member 23 at its forward end supported on a wheel 24 and provided with handle bars 25. The frame carries a motor 26 with usual accessories and transmission mechanism and a saddle or operator's seat 27. As the details of the motorcycle are not pertinent to the present invention, they will not be described further.

Secured to the rear of frame 21 and straddling the rear wheel is a plate 30 of inverted U-form and suitably reinforced for stiffness. Mounted on each leg of this plate is a pair of eyes or brackets 31 having one end of an arm 32 pivotally secured therein. Pivotally secured in the other end of arm 32 is a steering knuckle 33, having a wheel 34 journalled thereon. Knuckle 33 is provided with the usual steering arm 35 having the rod 36 connected to it by clevis 37 and arranged to swing it. This rod is pinned to a bracket 38 mounted on plate 30 and is of telescopic construction. (See Figs. 7 and 8.)

Clevis 37 is provided with a long shank 39 which is slidable within a hollow section 40 provided with an eye for connection to bracket 38. Shank 39 is provided with notches 39—*a* and 39—*b* and a detent 41 arranged to engage either notch is mounted in a boss 42 formed on section 40. Pivoted on section 40 near this boss is a thumb lever 43 having one end engaging a notch in detent 41 and the other end engaged by a compression spring 44. This arrangement is such that the detent is normally urged into engagement with either notch 39—*a* or 39—*b* by spring 44, thus preventing relative movement of parts 39 and 40, but may be disengaged when such movement is desired by depressing the outer end of lever 43.

A bar 45 is attached to the knuckle pin in the outer end of arm 32 adjacent steering knuckle 33 and forms one member of a toggle joint or brace. A pair of bars 46 are pivotally secured to the other end of bar 45 and form the other member of the toggle joint, their inner ends being pinned to a bracket 47 mounted on plate 30. This toggle when straight forms a locking brace to hold arm 32 in its full open position as shown in Fig. 2. Adjacent the joint of arms 45 and 46 is a catch to retain the arms in straight relationship (see Figs. 14, 15 and 17). A pin 48 is rotatably mounted in arms 45 and has plates 49 attached to its ends, a knob 50 being provided for turning it. Plates 49 in their short dimension are the same width as bar 45, thus when they are turned as shown in dotted lines (Fig. 15) they will allow the toggle to "break", but when in the position shown by solid lines will hold it straight. A flat spring 51 is provided to engage one of the plates and hold it against accidental movement.

A latch 52 is mounted on plate 30 to retain arms 32 in folded position. (See Figs. 9, 10 and 11). A toothed member 53 is slidably mounted in a sleeve 54 secured to plate 30, and is normally held projected by a compression spring 55 engaging a small lever 56 pivotally mounted on plate 32 and engaged in a slot in member 53. The member 53 may be retracted by operation of lever 56. The tooth engages a suitable projection on arm 32, such as an extension of the knuckle pin.

Brackets 58—*a* and 58—*b* are secured near the bottom of plate 30 and carry a bar 59 which has a coil spring 60 attached to it (see Figs. 12 and 13). The purpose of this will be described later. Bar 59 is preferably of square or of rectangular section, slidable in correspondingly shaped openings in brackets 58—*a* and 58—*b* and has a rounded portion 59—*a* intermediate its ends, so that by sliding it to the left (Fig. 12) the square parts will disengage the brackets and the round portion 59—*a* will be positioned in bracket 58—*a*. This will allow the bar to gravitate downward or to be turned to make a half turn, lowering spring 60 to the position shown by broken lines.

Assuming that the bicycle is being towed, all parts will then be as shown in Figs. 1, 2 and 3 wheels 24 and 34 being on the ground and driving wheel 22 being off the ground and not revolving. Arms 32 are in extended position and are held there by toggle arms 45 and 46 which are locked straight. The machine is in effect a tricycle and may be towed in any convenient manner as by a tow bar 61 attached to the rear of an automobile and when the parts are constructed in the relative proportions and arrangement indicated in the drawings the motorcycle will not tip over even when being towed rapidly around corners and over the commonly existing road surface irregularities.

When it is desired to convert it to a bicycle, the machine may be held upright by any suitable mechanism, if the motorcycle is provided with a prop, such arrangements being well know in the art. The prop is not necessary, however, as the operator can easily maintain the balance of the motorcycle while folding up the auxiliary wheels. One of the detents 41 is disengaged from its notch 39—*a*, the catch on toggle arms 45 and 46 (on the same side of the machine) is released by turning knob 50 and the toggle "broken". Arm 32 may then be swung upward and engaged by latch 52. Similarly arm 32 on the other side may be raised, after which all parts will be as shown in Figs. 5 and 6, traction wheel 22 resting on the ground.

When for any reason it is desired to operate the machine under its own power, but due to slippery roads or other conditions, it is not practical to operate it as a bicycle, wheels 34 may be used as carrying or balancing wheels in the four wheel position as shown in Fig. 4. To convert the device from a two wheeled cycle to a four wheeled cycle the operator first rotates the springs 60 upwardly and then depresses both handles 56 thus releasing the wheel brackets and allowing them to swing outwardly and down by reason of their own weight. The shanks 39 will telescope into the hollow sleeves 40 until the detent 41 automatically engages the notches 39—*b* as the auxiliary wheels reach the four wheel position, that is, contacting the ground simultaneously with the drive wheel. At this time the toggle arms will still be broken at their joints (see Fig. 4) and the springs 60 will be engaged by the heels of the toggle bars 45. (See Figs. 4 and 13). Thus wheel 22 may propel the vehicle while it is held upright by wheels 34. The arms 45 being carried on springs 60 introduce sufficient flexibility to allow any of the three rear wheels to ride over bumps or depressions without the drive wheel losing contact with the ground.

To convert the cycle from the four wheel to the three wheel position the operator will disengage one of the detents 41 from its notch 39—*b* and straighten the associated toggle lever by pulling outwardly and upwardly thereon. The detent will then automatically engage the three wheel position notch 39—*a* as the shank 39 telescopes further into the sleeve 40. This operation partially elevates the drive wheel. The knob 50 is then turned to lock the toggle in straightened position. In a similar manner the operator straightens the toggle of the opposite wheel completing the elevation of the drive wheel.

By breaking the toggles and disengaging the detents, operating on one auxiliary wheel at a time, the cycle may be restored conveniently to four wheel position, and thereafter converted to two wheel position, if desired, without much difficulty or physical effort. Thus it will be understood that the conversation of the cycle from one condition to another may be accomplished so rapidly and conveniently that a motorcycle equipped and operated in accordance with this invention may be used very efficiently in calling for and delivering automobiles, and the services of one man only are required. As indicated in the drawings the auxiliary wheels are preferably equipped with pneumatic tires of usual construction.

What I claim is:—

1. A convertible bicycle comprising a frame having bicycle wheels in line, one of said bicycle wheels being a traction wheel; a pair of arms, said arms being connected by joints to opposite sides of said frame for positioning in folded position against said frame or in open position outstanding from said frame, a pair of tricycle wheels journalled on said arms at the outer ends thereof, said arms being jointed to said frame so that when disposed in folded position said wheels are located above ground engaging position and when disposed in outstanding position said wheels are disposed in ground engaging position either at or below ground engaging level of said traction wheel, toggle braces extending between said frame and said arms to lock said arms in outstanding position with said tricycle wheels below ground engaging level of said traction wheel, and means on said frame to support the joints of said toggle braces in position with said tricycle wheels at ground engaging level with said traction wheel.

2. A convertible bicycle comprising a frame having bicycle wheels in line, a pair of arms, said arms being connected by joints to opposite sides of said frame for positioning in folded position against said frame or in open position outstanding from said frame, a pair of spindle knuckles mounted on said arms at the outer ends thereof, a pair of tricycle wheels journalled on the spindles of said knuckles, said arms being jointed to said frame so that when disposed in folded position said wheels are located above ground engaging position and when disposed in outstanding position said wheels are disposed in ground engaging position, telescopic tie rods, one connected to each knuckle and anchored at its other end to the frame for positioning its tricycle wheel in travelling alinement with said bicycle wheels when said arm is in outer position and for lying flat in relation to said frame in folded position of said arms, means to lock said tie rods against extension or contraction with said tricycle wheels in either position, and toggle braces to lock said arms in outstanding position.

3. A convertible bicycle comprising a frame having bicycle wheels in line, one of said bicycle wheels being a traction wheel; a pair of arms, said arms being connected by joints to opposite sides of said frame for positioning in folded position against said frame or in open position outstanding from said frame, a pair of spindle knuckles mounted on said arms at the outer ends thereof, a pair of tricycle wheels journalled on the spindles of said knuckles, said arms being jointed to said frame so that when disposed in folded position said wheels are located above ground engaging position and when disposed in outstanding position said wheels are disposed in ground engaging position either at or below ground engaging lever of said traction wheel, telescopic tie rods, one connected to each knuckle and anchored at its other end to the frame for positioning its tricycle wheel in travelling alinement with said bicycle wheels when said arm is in either outer position and for lying flat in relation to said frame in folded position of said arms, means to lock said tie rods against extension or contraction with said tricycle wheels in either position of its three positions and toggle braces to lock said arms in outstanding position.

4. A convertible bicycle comprising a frame having bicycle wheels in line, one of said bicycle wheels being a traction wheel; a pair of arms, said arms being connected by joints to opposite sides of said frame for positioning in folded position against said frame or in open position outstanding from said frame, a pair of spindle knuckles mounted on said arms at the outer ends thereof, a pair of tricycle wheels journalled on the spindles of said knuckles, said arms being jointed to said frame so that when disposed in folded position said wheels are located above ground engaging position and when disposed in outstanding position said wheels are disposed in ground engaging position either at or below ground engaging level of said traction wheel, telescopic tie rods, one connected to each knuckle and anchored at its other end to the frame for positioning its tricycle wheel in travelling alinement with said bicycle wheels when said arm is in either outer position and for lying flat in relation to said frame in folded position of said arms, means to lock said tie rods against extension or contraction with said tricycle wheels in any one of its three positions, toggle braces extending between said frame and said arms to lock said arms in outstanding position with said tricycle wheels below ground engaging level of said traction wheel, and means on said frame to support the joints of said toggle braces in position with said tricycle wheels at ground engaging level with said traction wheel.

5. A convertible bicycle comprising a frame having bicycle wheels in line, one of said bicycle wheels being a traction wheel; a pair of arms, said arms being connected by joints to opposite sides of said frame for positioning in folded position against said frame or in open position outstanding from said frame, a pair of spindle knuckles mounted on said arms at the outer ends thereof, a pair of tricycle wheels journalled on the spindles of said knuckles, said arms being jointed to said frame so that when disposed in folded position said wheels are located above ground engaging position and when disposed in outstanding position said wheels are disposed in ground engaging position either at or below ground engaging level of said traction wheel, telescopic tie rods, one connected to each knuckle and anchored at its other end to the frame for positioning its tricycle wheel in travelling alinement with said bicycle wheels when said arm is in either outer position and for lying flat in relation to said frame in folded position of said arms, means to lock said tie rods against extension or contraction with said tricycle wheels in either position of its three positions, toggle braces extending between said frame and said arms to lock said arms in outstanding position with said tricycle wheels below ground engaging level of said traction wheel, the section of each of said toggle braces connected to a knuckle having a heel extending beyond its joint, and resilient means on said frame adjustably disposed to be positioned to support said heel or to out of support position.

6. A convertible bicycle comprising a frame having bicycle wheels in line, a pair of arms, said arms being connected by joints to opposite sides of said frame for positioning in folded position against said frame or in open position outstanding from said frame, a pair of tricycle wheels journalled on said arms at the outer ends thereof, said arms being jointed to said frame so that when disposed in folded position said wheels are located above ground engaging position and when disposed in outstanding position said wheels are disposed in ground engaging position, toggle braces extending between said frame and said arms to lock said arms in outstanding position, and clamps on said frame for holding said arms in folded position.

7. A convertible bicycle comprising a frame having bicycle wheels in line, one of said bicycle wheels being a traction wheel; a pair of arms, said arms being connected by joints to opposite sides of said frame for positioning in folded position against said frame or in open position outstanding from said frame, a pair of tricycle wheels journalled on said arms at the outer ends thereof, said arms being jointed to said frame so that when disposed in folded position said wheels are located above ground engaging position and when disposed in outstanding position said wheels are disposed in ground engaging position either at or below ground engaging level of said traction wheel, toggle braces extending between said frame and said arms to lock said arms in outstanding position with said tricycle wheels below ground engaging level of said traction wheel, means on said frame to support the joints of said toggle braces in position with said tricycle wheels at ground engaging level with said traction wheel, and clamps on said frame for holding said arms in folded position.

8. A convertible bicycle comprising a frame having bicycle wheels in line, a pair of arms, said arms being connected by joints to opposite sides of said frame for positioning in folded position against said frame or in open position outstanding from said frame, a pair of spindle knuckles mounted on said arms at the outer ends thereof, a pair of tricycle wheels journalled on the spindles of said knuckles, said arms being jointed to said frame so that when disposed in folded position said wheels are located above ground engaging position and when disposed in outstanding position said wheels are disposed in ground engaging position, telescopic tie rods, one connected to each knuckle and anchored at its other end to the frame for positioning its tricycle wheel in travelling alinement with said bicycle wheels when said arm is in either outer position and for lying flat in relation to said frame in folded position of said arms, means to lock said tie rods against extension or contraction with said tricycle wheels in either position of its three positions, a toggle brace to lock said arms in outstanding position, and clamps on said frame for holding said arms in folded position.

9. A convertible bicycle comprising a frame having bicycle wheels in line, one of said bicycle wheels being a traction wheel; a pair of arms, said arms being connected by joints to opposite sides of said frame for positioning in folded position against said frame or in open position outstanding from said frame, a pair of spindle knuckles mounted on said arms at the outer ends thereof, a pair of tricycle wheels journalled on the spindles of said knuckles, said arms being jointed to said frame so that when disposed in folded position said wheels are located above ground engaging position and when disposed in outstanding position said wheels are disposed in ground engaging position either at or below ground engaging level of said traction wheel, telescopic tie rods, one connected to each knuckle and anchored at its other end to the frame for positioning its tricycle wheel in travelling alinement with said bicycle wheels when said arm is in either outer position and for lying flat in relation to said frame in folded position of said arms, means to lock said tie rods against extension or contraction with said tricycle wheels in either position of its three positions, toggle braces extending between said frame and said arms to lock said arms in outstanding position with said tricycle wheels below ground engaging level of said traction wheel, the section of each of said toggle braces connected to a knuckle having a heel extending beyond its joint, and resilient means on said frame adjustably disposed to be positioned to support said heel or to out of support position, and clamps on said frame for holding said arms in folded position.

10. An attachment for a bicycle comprising a pair of substantially flat brackets each having a substantially great width relative to its length, means pivotally securing one of said brackets along its width to the frame of said bicycle on one side of the driving wheel thereof, for vertical movement relative to said driving wheel, means pivotally securing the other of said brackets along its width to the frame of said bicycle on the opposite side of said driving wheel for vertical movement relative to said driving wheel, an auxiliary wheel journaled to the outer end of each bracket and movable with the bracket to a plurality of positions including one position in which the auxiliary wheels engage the ground when the bicycle is upright, another position in which the auxiliary wheels are above the ground, and a toggle lever for each of said brackets, one end of which is connected to the outer end of the bracket and the opposite end of which is connected to the frame of said bicycle above the point of attachment of said bracket for bracing the bracket when in extended position.

11. An attachment for a bicycle comprising a pair of substantially flat brackets each having a substantially great width relative to its length, means pivotally securing one of said brackets along its width to the frame of said bicycle on one side of the driving wheel thereof for vertical movement relative to said driving wheel, means pivotally securing the other of said brackets along its width to the frame of said bicycle on the opposite side of said driving wheel for vertical movement relative to said driving wheel, an auxiliary wheel journalled to the outer end of each bracket and movable with the bracket to a plurality of positions including one position in which the auxiliary wheels engage the ground when the bicycle is upright and another position in which the auxiliary wheels are above the ground, a third position in which the auxiliary wheels engage the ground below the level of said driving wheel when said bicycle is upright, a toggle lever for each bracket, one end of which is secured to the outer end of said bracket and the other end of which is secured to the frame of said bicycle at a point above the point of attachment of said bracket, whereby said toggle lever in extended position braces said bracket in said last named position and when collapsed permits said bracket to be folded relative to said driving wheel, and resilient means supporting said toggle lever in a partially folded position to constitute a resilient brace for said bracket when the bracket is in said first named position.

12. An attachment for bicycles comprising an inverted U-shaped support adapted to straddle the driving wheel of said bicycle, the outer ends of the legs of said U-shaped support extending through a considerable horizontal distance parallel to the plane of movement of said driving wheel, a pair of substantially flat brackets, one for each side of said driving wheel having one end thereof of substantial width relative to its length, means for securing said end of each of said brackets to the horizontally extending portion of said support for movement about a horizontal pivot to permit said brackets to be folded against said support or to be extended laterally therefrom, an auxiliary wheel journalled to each of said brackets for engaging the ground when said bicycle is in upright position and said brackets extended.

13. An attachment for bicycles comprising a pair of brackets, one for each side of the driving wheel of said bicycle, horizontally extending pivot means connecting one end of each of said brackets to the frame of said bicycle for substantially vertical movement relative to said driving wheel to permit said bracket to be folded against said driving wheel or to be extended laterally therefrom, a knuckle for each of said brackets pivoted to the outer ends thereof, an auxiliary wheel journalled on each of said knuckles, a tie rod extending between each of said knuckles and the adjacent side of said bicycle frame for maintaining said auxiliary wheels substantially parallel to said driving wheel when said bracket is in either folded or extended position.

14. An attachment for a bicycle comprising a pair of substantially flat brackets each having a substantially great width relative to its length, means pivotally securing one of said brackets along its width to the frame of said bicycle on one side of the driving wheel thereof for vertical movement relative to said driving wheel, means pivotally securing the other of said brackets along its width to the frame of said bicycle on the opposite side of said driving wheel for vertical movement relative to said driving wheel, an auxiliary wheel journalled to the outer end of each bracket and movable with the bracket to a plurality of positions including one position in which the auxiliary wheels engage the ground when the bicycle is upright and another position in which the auxiliary wheels are above the ground, a third position in which the auxiliary wheels engage the ground below the level of said driving wheel when said bicycle is upright, a toggle lever for each bracket, including two halves, one end of which is secured to the outer end of said bracket and the other end of which is secured to the frame of said bicycle at a point above the point of attachment of said bracket, whereby said toggle lever in extended position braces said bracket in said last named position and when collapsed permits said bracket to be folded relative to said driving wheel, a projection formed upon the inner end of one of said halves, and a spring secured to said frame and engageable by said projection when said toggle lever is partially folded and said wheels are in said first named position.

15. In combination with a motorcycle, a pair of auxiliary wheels and axles therefor, mounting means on opposite sides of the cycle each pivotally connected with the cycle and with an auxiliary wheel along spaced apart parallel axes which extend longitudinally relatively to the cycle frame constructed and arranged to hold said wheels parallel to the cycle frame both when contacting the ground and when elevated into retracted position close to the cycle frame, and means yieldingly connecting each axle with the cycle frame when the drive wheel and both auxiliary wheels all contact the ground arranged for yielding balancing of the cycle on said auxiliary wheels.

16. In combination with a motorcycle, a pair of auxiliary wheels and axles therefor, mounting means on opposite sides of the cycle pivotally connected therewith and each with one of said axles along spaced apart axes extending longitudinally relatively to the cycle and provided with means for holding said axles horizontal and perpendicular to the cycle frame when the auxiliary wheels contact the ground and when they are retracted upwardly by upward rotation of said mounting means, said mounting means being pivoted and constructed to retract said wheels upwardly without increasing the over-all longitudinal dimension of the motorcycle.

17. In combination with a motorcycle, a pair of auxiliary wheels and axles therefor, means for mounting said wheels on opposite sides of the cycle and pivotally connected with the cycle and each with one of said wheel axles along axes extending longitudinally relatively to the cycle, said mounting means being constructed to hold the auxiliary wheels substantially parallel to the motorcycle drive wheel both when the wheels are on the ground and when retracted close to the cycle frame, means for holding said wheels in upward retracted position, means for connecting said wheel axles yieldingly to the cycle frame when both auxiliary wheels and the drive wheel are on the ground for balancing the cycle, and means for holding said auxiliary wheels rotated on their mounting means relatively to the cycle frame to hold said drive wheel supported thereby off the ground.

18. In combination with a motorcycle, a pair of auxiliary wheels and axles therefor, mounting means on opposite sides of the cycle connecting each axle pivotally to the cycle frame with the auxiliary wheels spaced apart sufficiently when contacting the ground and when the motorcycle drive wheel is supported thereon for balancing the motorcycle when being towed, said mounting means being rotatable to carry said auxiliary wheels upwardly close to the cycle frame, means for retaining said wheels when in upward retracted position substantially parallel to the cycle frame, means for holding said mounting means rotated downwardly sufficiently relatively to the cycle to support the drive wheel off the ground, and means for connecting said wheel axles yieldingly with said frame when the auxiliary wheels and drive wheel are all on the ground for balancing the motorcycle on said auxiliary wheels.

19. In combination with a motorcycle, a pair of auxiliary wheels and axles therefor, means for mounting said wheels on opposite sides of the cycle including arms pivotally connected to the cycle and the respective axles on pivotal axes extending longitudinally relatively to the cycle, means operatively connected with said axles for holding said wheels substantially vertical and parallel to the cycle frame both when elevated on said arms close to the cycle and when lowered and extended away from said cycle contacting the ground, means for positioning said mounting means to hold the motorcycle drive wheel supported therebetween above the ground with the auxiliary wheels spaced far enough apart to balance the cycle when being towed, and means yieldingly connecting each axle with the cycle frame when the drive wheel and both auxiliary wheels all contact the ground arranged for yielding balancing of the cycle on said auxiliary wheels.

In witness of the foregoing I affix my signature.

ALBERT LAURANCE HESS.